US009769595B2

(12) United States Patent
Oksanen et al.

(10) Patent No.: US 9,769,595 B2
(45) Date of Patent: Sep. 19, 2017

(54) METHOD AND APPARATUS FOR PROVIDING MOBILE SERVICES OUTSIDE OF CELLULAR COVERAGE

(71) Applicant: Nokia Technologies Oy, Espoo (FI)

(72) Inventors: Markku Oksanen, Helsinki (FI); Jari-Jukka Kaaja, Jarvenpaa (FI); Joni Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/840,889

(22) Filed: Aug. 31, 2015

(65) Prior Publication Data

US 2015/0373486 A1    Dec. 24, 2015

Related U.S. Application Data

(63) Continuation of application No. 13/695,212, filed as application No. PCT/FI2011/050267 on Mar. 30, 2011, now Pat. No. 9,125,005.

(60) Provisional application No. 61/329,755, filed on Apr. 30, 2010.

(51) Int. Cl.
*H04B 7/00* (2006.01)
*H04B 7/15* (2006.01)
(Continued)

(52) U.S. Cl.
CPC ......... *H04W 4/008* (2013.01); *H04W 76/023* (2013.01); *H04W 88/04* (2013.01)

(58) Field of Classification Search
CPC .......... H04B 1/40; H04B 5/02; H04B 5/0031; H04B 5/0062; H04B 7/00; H04B 7/24;
(Continued)

(56) References Cited

U.S. PATENT DOCUMENTS 5,030,807 A * 7/1991 Landt .................... B61L 25/048
                                                              235/375
5,898,315 A    4/1999 Knaack
(Continued)

FOREIGN PATENT DOCUMENTS

CN    1736041     2/2006
EP    1372299     12/2003
(Continued)

OTHER PUBLICATIONS

Cao, H., et al.; *"Enabling Technologies for Wireless Body Area Networks: A Survey and Outlook;"* Consumer Communications and Networking—IEEE Communications Magazine, vol. 47, No. 12; pp. 84-93; dated Dec. 2009.
(Continued)

*Primary Examiner* — Quochien B Vuong
(74) *Attorney, Agent, or Firm* — Alston & Bird LLP (57) ABSTRACT

A method, apparatus and computer program product are provided for providing mobile services outside of cellular coverage. In the context of a method, an indication is received, at an intermediate device, of data for transmission to a target device for which cellular network communication between an originating device and the target device is not currently available. The method also includes receiving data corresponding to the indication from a memory buffer associated with a short range communication link. The method further includes causing communication of the data via a long range communication link to enable communication of the data to the target device.

17 Claims, 6 Drawing Sheets

(51) Int. Cl.
*H04W 4/00* (2009.01)
*H04W 76/02* (2009.01)
*H04W 88/04* (2009.01)

(58) Field of Classification Search
CPC ............... H04M 1/7253; H04M 15/93; H04M 2250/02; H04M 2250/04; H04W 4/008
USPC ............. 455/7, 11.1, 12.1, 41.1, 41.2, 552.1, 455/553.1
See application file for complete search history.

(56) References Cited

U.S. PATENT DOCUMENTS

| | | | |
|---|---|---|---|
| 6,434,665 B1 | 8/2002 | Shepherd et al. | |
| 6,735,417 B2 | 5/2004 | Fonseca, Jr. et al. | |
| 6,909,705 B1 | 6/2005 | Lee et al. | |
| 7,089,033 B2 | 8/2006 | Leinonen et al. | |
| 7,610,451 B2 | 10/2009 | Wolrich et al. | |
| 7,720,021 B1 | 5/2010 | Zhou et al. | |
| 7,773,989 B2 | 8/2010 | Tobe et al. | |
| 7,876,733 B2 | 1/2011 | Hyon et al. | |
| 8,547,232 B2 * | 10/2013 | Boldyrev | G06F 12/1416 340/10.1 |
| 8,774,706 B2 | 7/2014 | Ge et al. | |
| 2004/0033778 A1 | 2/2004 | Fonseca, Jr. et al. | |
| 2008/0225789 A1 | 9/2008 | Kim et al. | |
| 2008/0244018 A1 | 10/2008 | Chen et al. | |
| 2010/0058359 A1 | 3/2010 | Ferlitsch | |

FOREIGN PATENT DOCUMENTS

| | | |
|---|---|---|
| EP | 1959410 | 8/2008 |
| WO | WO 2007/116250 A2 | 10/2007 |
| WO | WO 2008/000884 A1 | 1/2008 |
| WO | WO 2008/049970 A1 | 5/2008 |
| WO | WO 2008/152531 A1 | 12/2008 |
| WO | WO-2009/136355 A1 | 11/2009 |

OTHER PUBLICATIONS

Extended European Search Report for Application No. 11774464.9; dated Jan. 21, 2014.
International Search Report for Application No. PCT/FI2011/050267; dated Aug. 8, 2011.
Introduction to Propagation [online] [retrieved Apr. 15, 2015]. Retrieved from the Internet: <URL: http://www.anarc.org/wtfda/propagation.htm> . 6 pages.
Jantunen, I., et al.; "*Smart sensor architecture for mobile-terminal-centric ambient intelligence*;" Sensors and Actuators A, vol. 142, No. 1; pp. 352-260; dated Feb. 2008.
Kaasinen, E., et al.; "*Ubimedia based on readable and writable memory tags*;" Multimedia Systems, vol. 16, No. 1; pp. 57-74; dated Dec. 2009.
Nasir, A., et al.; "*PipeSense: A framework architecture for in-pipe water monitoring system*;" IEEE 9th Malaysia International Conference on Communications; pp. 703-708; dated Dec. 2009
Notice of Allowance for corresponding U.S. Appl. No. 13/695,212 dated Apr. 28, 2015.
Notice of Allowance for corresponding U.S. Appl. No. 13/695,212 dated Jan. 30, 2015.
Office Action for corresponding U.S. Appl. No. 13/695,212 dated Aug. 13, 2014.
Office Action from Chinese Patent Application No. 201180031222.4, dated Dec. 31, 2014.
Office Action from Chinese Patent Application No. 201180031222.4, dated Sep. 14, 2015.
Pactor [online] [retrieved Apr. 15, 2015]. Retrieved from the Internet <URL: http://en.wikipedia.org/wiki/PACTOR> . 3 pages.
Pentland, Alex et al.; "DakNet: Rethinking Connectivity in Developing Nations"; IEEE Computer Society; Jan. 2004; pp. 4-9.
Radio-Electronics.com; Meteor Scatter or Meteor Burst Communications [online] [retrieved Apr. 15, 2015]. Retrieved from the Internet: <URL: http://web.archive.org/web/20101007033023/http://radio-electronics.com/info/propagation/meteor-scatt . . . >. 6 pages.
Written Opinion from International Patent Application No. PCT/FI2011/050267 dated Aug. 8, 2011.
Office Action for Chinese Application No. 201180031222.4 dated Apr. 12, 2016.
Office Action from Chinese Patent Application No. 201180031222.4, dated Sep. 30, 2016.
Office Action for Chinese Application No. 201180031222.4 dated Feb. 27, 2017.
Extended European Search Report for corresponding European Patent Application No. 17161669.1 dated Jun. 22, 2017, 9 pages.

* cited by examiner

METHOD AND APPARATUS FOR PROVIDING MOBILE SERVICES OUTSIDE OF CELLULAR COVERAGE

CROSS-REFERENCE TO RELATED APPLICATIONS

This application is a continuation of and claims priority to U.S. application Ser. No. 13/695,212, filed Mar. 20, 2013, which is a national phase entry of International Application No. PCT/FI2011/050267, filed on Mar. 30, 2011, which claims the benefit of U.S. Provisional Application No. 61/329,755, filed Apr. 30, 2010, all of the contents of each of which are hereby incorporated in their entirety.

TECHNOLOGICAL FIELD

Embodiments of the present invention relate generally to network communication technology and, more particularly, relate to a method, apparatus and computer program product for providing mobile services outside of cellular coverage.

BACKGROUND

The modern communications era has brought about a tremendous expansion of wireline and wireless networks. Computer networks, television networks, and telephony networks are experiencing an unprecedented technological expansion, fueled by consumer demand. Networking technologies have addressed related consumer demands, while providing more flexibility and immediacy of information transfer.

Current and future networking technologies continue to facilitate ease of information transfer and convenience to users by expanding the capabilities of electronic devices and by improving network performance. One area in which there is a demand to increase ease of information transfer relates to the delivery of services to a user of an electronic device. The services may be in the form of a particular media or communication application desired by the user, such as a music player, a game player, an electronic book, short messages, email, content sharing, web browsing, etc. Moreover, it is a goal of network operators to provide such services to devices that are enabled to remain mobile, and to provide such services with minimal interruption to provide a good user experience.

These and other services are typically easily provided to electronic devices that are within a coverage area (or cell) of a base station or access point that transmits data wirelessly to mobile electronic devices within the corresponding cell. However, in some remote areas or certain use cases, it may be desirable to provide certain services to devices that are outside the coverage area of the base station.

BRIEF SUMMARY

A method, apparatus and computer program product are therefore provided to enable the provision of mobile services outside the typical coverage area of a cell. Moreover, some embodiments may enable the provision of burst radio link communications with best effort over long distances between transmission and reception devices (e.g., access points) having devices within their respective coverage areas in order to enable the devices to provide data or content from one device to another. Furthermore, in some embodiments, the access points may be enabled to communicate with the devices within their respective coverage areas via short range communication techniques and aspects of cognitive radio may be employed.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the provision of mobile services outside the typical coverage area of a cell. Some embodiments may therefore enable the provision of long range radio communications such as burst radio link communications or ionospheric links with best effort between access points. An access point having a device (e.g., a mobile terminal) within its coverage area may therefore receive (either by push or by pulling data from the mobile terminal) data for transmission to another device, and evaluate the long range radio link in order to send the data when suitable conditions are detected. Another access point, having communication or the potential for communication with the intended target may then receive the data via the long range radio link and provide it to the intended target when able. As such, embodiments of the present invention may utilize aspects of cognitive radio.

Furthermore, some embodiments may enable the access point to provide not only the data or content to be communicated, but also application and/or configuration information so that the intended target can execute the content and the corresponding application regardless of whether the target device otherwise has the corresponding application available.

Figure 1:
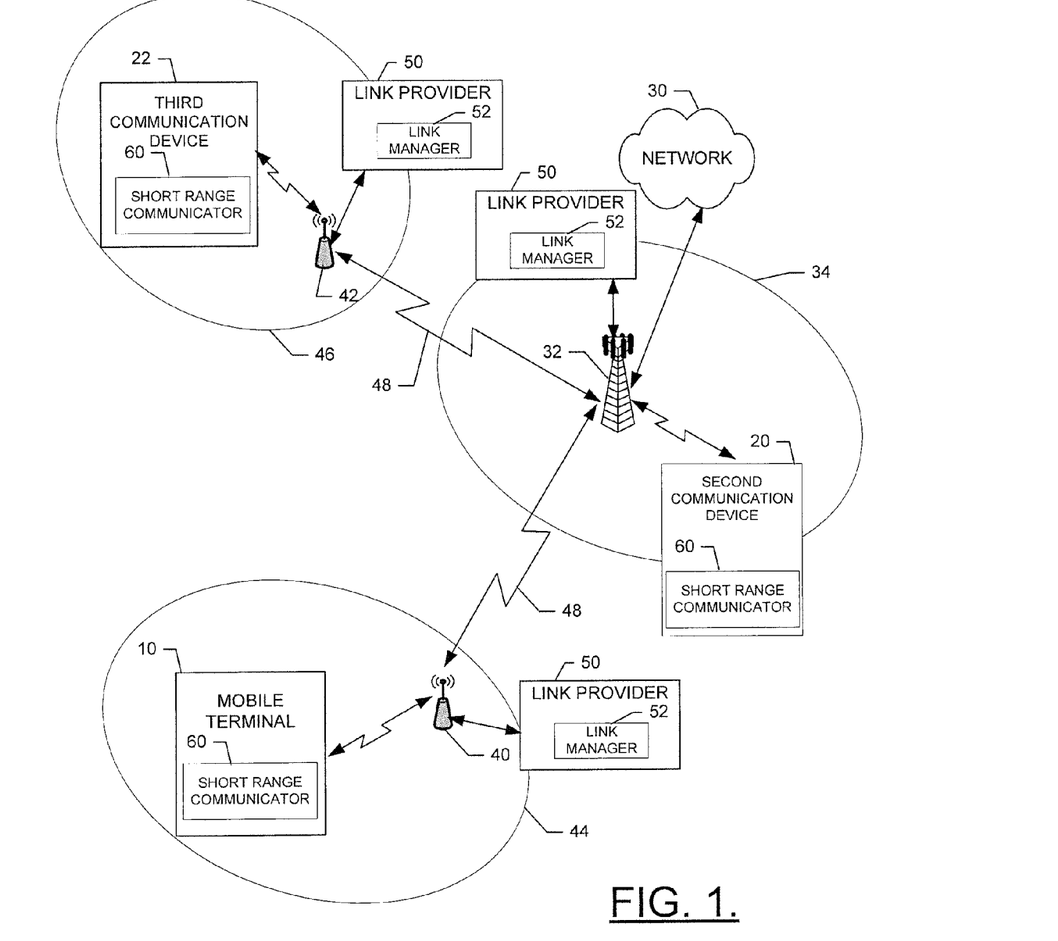
FIG. 1 is a schematic block diagram of a wireless communications system according to an example embodiment of the present invention.

FIG. 1 illustrates a generic system diagram in which a device such as a mobile terminal 10, which may benefit from embodiments of the present invention, is shown in an example communication environment. As shown in FIG. 1, a system in accordance with an example embodiment of the present invention includes a communication device (e.g., mobile terminal 10) that may be capable of providing data to other communication devices (e.g., second communication device 20 or third communication device 22) or to network devices that may be in communication with a network 30. The mobile terminal 10 may be able to communicate with network devices and/or with other communication devices via embodiments of the present invention.

While an example embodiment of the mobile terminal 10 may be illustrated and hereinafter described for purposes of example, numerous types of mobile terminals, such as portable digital assistants (PDAs), pagers, mobile Internet devices, mobile telephones, mobile televisions, gaming devices, laptop computers, cameras, camera phones, video recorders, audio/video player, radio, positioning (e.g., global positioning system (GPS)) devices, navigation devices, or any combination of the aforementioned, and other types of voice and text communications systems, may readily employ or benefit from embodiments of the present invention. Furthermore, devices that are not mobile may also readily employ embodiments of the present invention. As such, for example, the second communication device 20 may be an example of a fixed terminal (e.g., a personal computer (PC) or other electronic device) that is positioned within a coverage area of a base station 32. However, in some embodiments, the second communication device 20 could also be a mobile device.

In an example embodiment, the base station 32 may include hardware and software configured to enable the base station 32 to receive data from and provide data to devices that are within the coverage area (or cell 34) that is defined for the base station 32. As such, for example, the base station 32 may provide a wireless link to devices within the cell 34 for the provision of data and/or services to wireless communication devices (e.g., such as the second communication device 20) via communication protocols that are defined for the base station 32.

In some embodiments, not all systems that employ embodiments of the present invention may comprise all the devices illustrated and/or described herein and some systems that employ embodiments of the present invention may employ more devices than those illustrated and described herein. In an example embodiment, the network 30 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Additionally, in some embodiments, the network 30 may represent multiple interconnected networks. For example, the base station 32 may provide the second communication device 20 with access to one or more cellular or mobile networks such as those listed above, and/or the base station 32 may provide access to a data network, such as a local area network (LAN), a metropolitan area network (MAN), and/or a wide area network (WAN), such as the Internet.

In an example embodiment, the base station 32 may be enabled to communicate with one or more other access points (e.g., access point 40 and other access point 42) via long range communication links 48. The long range communication links 48 may include burst communication radio links, VHF (very high frequency), ionosphere links and/or the like. As such, in some examples, the base station 32 may include a burst radio link to cellular network interworking unit.

The access point 40 (or 42) may be enabled to communicate with devices within its coverage area 44 (or 46) via any suitable communication mechanism. In some embodiments, the access point 40 (or 42) may be enabled to communicate with devices such as the mobile terminal 10 (or third communication device 22) via short range communication mechanisms such RFID (radio frequency identification), BT (Bluetooth), WLAN (wireless local area network), WUSB (wireless USB), and/or other relatively short range communication radios or protocols that may employ, for example, UHF (ultra high frequency), NFC (near field communication) or other power radios, or I-UWB (impulse ultra wideband) or other data radios. As shown in FIG. 1, the coverage areas 44, 46 of the access points 40, 42 may not overlap with the cell 34. Thus, in some examples, the communication link between the access points 40, 42 and the base station 32 may be provided only by the long range communication links 48.

In an example embodiment, the access points 40, 42 and the base station 32 may each include a link provider 50. The link provider 50 may include hardware and any software needed to provide management functionality as described in greater detail below. The link provider 50 may therefore include one or more antennas and corresponding receiver/transmitter circuitry for enabling long range communications as described above. The link provider 50 may also include one or more antennas and corresponding receiver/transmitter circuitry for enabling short range communication with devices within the coverage areas (e.g., 44 and 46) of the respective devices. In an example embodiment, the communication links provided by the link provider 50 may be managed by a link manager 52, described in greater detail below.

In an example embodiment, the mobile terminal 10 (and the second and third communication devices 20 and 22) may include a short range communicator 60 for communicating with the link provider 50 via the short range communication link established between the access point 40 and the mobile terminal 10. In an example embodiment, the short range communicator 60 may include hardware (e.g., antenna(s) and receive/transmit circuitry) and perhaps also software for carrying out functionality of the short range communicator 60. In some embodiments, the mobile terminal 10 may include a short range communication manager 62 (see FIG. 2) for managing operations of the short range communicator 60 with respect to the transmission of data from the mobile terminal 10 to the access point 40 or reception of data at the mobile terminal 10 from the access point 40.

In some embodiments, the link manager 52 and the short range communication manager 62 may each be embodied as an apparatus including hardware and/or components for handling (e.g., either directly or via execution of software) communication session setup and maintenance for the access points or communication devices, respectively. However, in some embodiments, one or more of the link manager 52 and the short range communication manager 62 may be embodied as a functional entity that is provided via software executed on hardware resources of the access points or communication devices, respectively.

Figure 2:
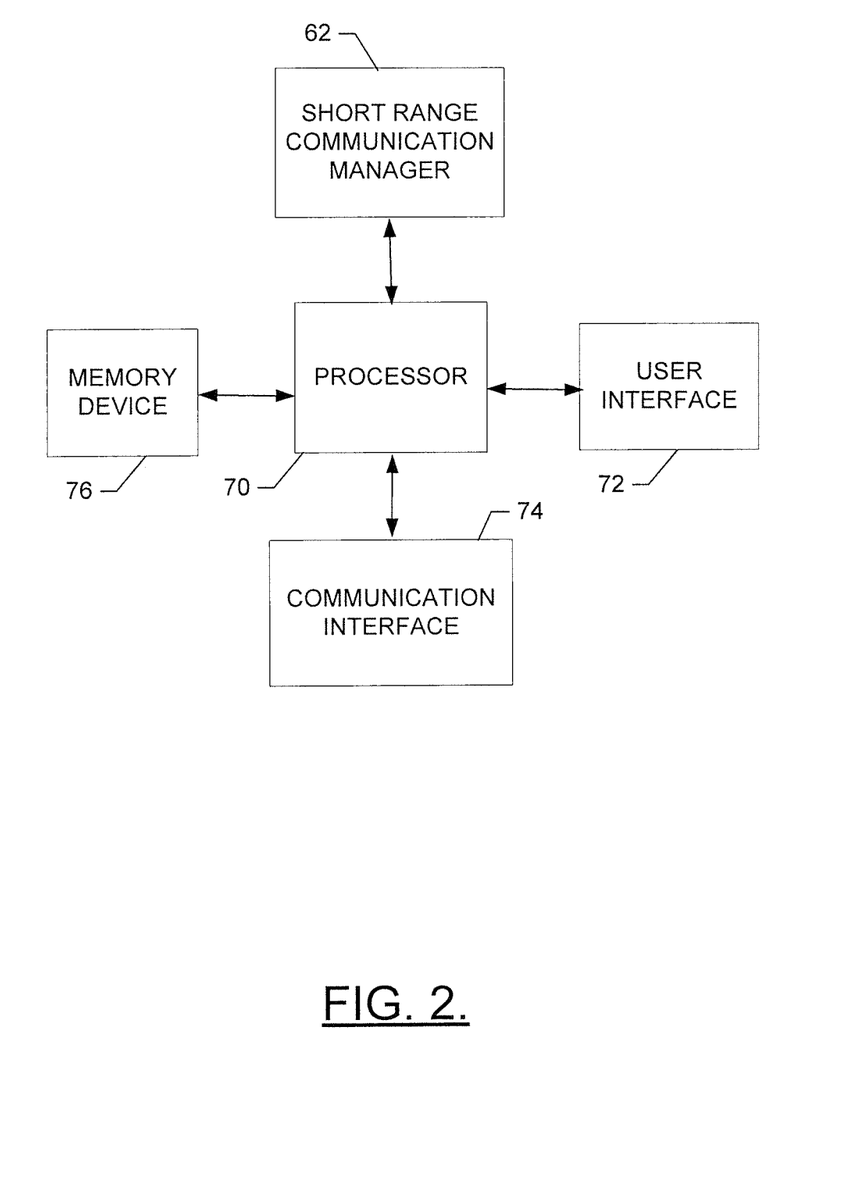
FIG. 2 illustrates a schematic block diagram of an apparatus for providing facilitation of the provision of mobile services outside of cellular coverage at a communication device according to an example embodiment of the present invention.

FIG. 2 illustrates a schematic block diagram of an apparatus for providing facilitation of the provision of mobile services outside of cellular coverage at a communication device according to an example embodiment of the present invention. An example embodiment of the invention will now be described with reference to FIG. 2, in which certain elements of an apparatus for providing facilitation of the provision of mobile services outside of cellular coverage at a communication device are displayed. The apparatus of FIG. 2 may be employed, for example, on the mobile terminal 10, the second communication device 20, the third communication device 22 and/or another communication device. However, it should be noted that the devices or elements described below may not be mandatory and thus some may be omitted in certain embodiments. Furthermore, additional components may be included in some embodiments.

Referring now to FIG. 2, an apparatus for providing facilitation of the provision of mobile services outside of cellular coverage at a communication device is provided. The apparatus may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structures defining memory cells configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms. In some embodiments, the short range communicator 60 may form a portion of the communication interface 74, be in communication with the communication interface 74 or otherwise be controlled by the communication interface.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control the short range communication manager 62. As such, in some embodiments, the processor 70 may be said to cause, direct or control the execution or occurrence of the various functions attributed to the short range communication manager 62 as described herein. The short range communication manager 62 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the short range communication manager 62 as described herein. Thus, in examples in which software is employed, a device or circuitry (e.g., the processor 70 in one example) executing the software forms the structure associated with such means.

In an example embodiment, the short range communication manager 62 may include or otherwise communicate with a tag (e.g., an embedded etag) that may comprise the short range communicator 60 provided for short range communication (e.g., NFC, UHF, RFID, BT and/or the like). As such, the short range communication manager 62 may generally be configured to provide communication of data to the access point 40 or receive communication from the access point 40 as described herein. In some embodiments, the tag (or etag) described above may be an RF memory tag (or embedded RF memory tag). The RF memory tag may include high speed data transfer capability via passive wireless memory tags in a relatively short time (e.g., on the order of a few seconds) with direct radio links. The RF memory tag may be faster than a typical RFID and may have relatively large storage capacities. In some examples, when powered with energy from a received transmission (e.g., a 900 MHz or 13.56 MHz transmission), one example device may have write capabilities on the order of 5 MB/s and read capabilities on the order of 50 MB/s. As such, the RF memory tag may include a buffer (e.g., a phase change memory (PCM) non-volatile memory buffer of, for example, 1 Gb) for storing data that is ready to be transmitted (e.g., as may be identified by the indication described above).

In some embodiments, the short range communication manager 62 may be configured to provide an indication of data that is available for transmission to a target device (e.g., the second communication device 20 or the third communication device 22). The indication may be provided to the access point 40 via the short range communicator 60 and the link provider 50. Having received the indication, the link provider 50 may establish a short range communication link with the short range communicator 60 to cause communication of the data to the access point 40. Thereafter, the access point 40 may communicate the data to the base station 32 for subsequent communication to the target device. Since the short range communicator 60 may be a tag for passive communication such as NFC, RFID or the like, in some embodiments, the mobile terminal 10 (or other communication device) may not even need to be powered on in order for data corresponding to the indication to be extracted there from for transmission to the access point 40. As such, for example, the access point 40 may be enabled to pull data (e.g., by mobile reading) from the short range communication manager 62 whether or not the mobile terminal 10 is powered on. In situations where the mobile terminal 10 is not powered on, a power radio field may be required to pull data from the passive RF memory tag.

In some embodiments, the short range communication manager 62 may be configured to receive data from the link provider 50 (e.g., via the short range communicator 60) that is provided from another device (e.g., the second communication device 20 or the third communication device 22) via long range communication (e.g., burst radio link, ionosphere link, VHF and/or the like). In other words, the link provider 50 of the access point 40 may receive data via long range communication with best effort from another link provider of another distant device (e.g., the base station 32). That data may have in turn been routed through the base station from another device (e.g., the second or third communication devices 20 or 22) via any combination of short and long range communication jumps to the final destination (e.g., the mobile terminal 10).

In an example embodiment, the short range communication manager 62 may be configured to access a user profile or other settings that may define user preferences for connection establishment with respect to information indicated as being available for transmission to the access point 40 or for information being received from the access point 40. For example, the short range communication manager 62 may be configured to access profile information that designates a preference of the user with respect to connecting automatically to access points based on certain criteria. In some embodiments, one of the criteria upon which a decision may be made to automatically establish a connection between the mobile terminal 10 and the access point 40 may be whether the access point 40 requests such a connection.

Figure 3:
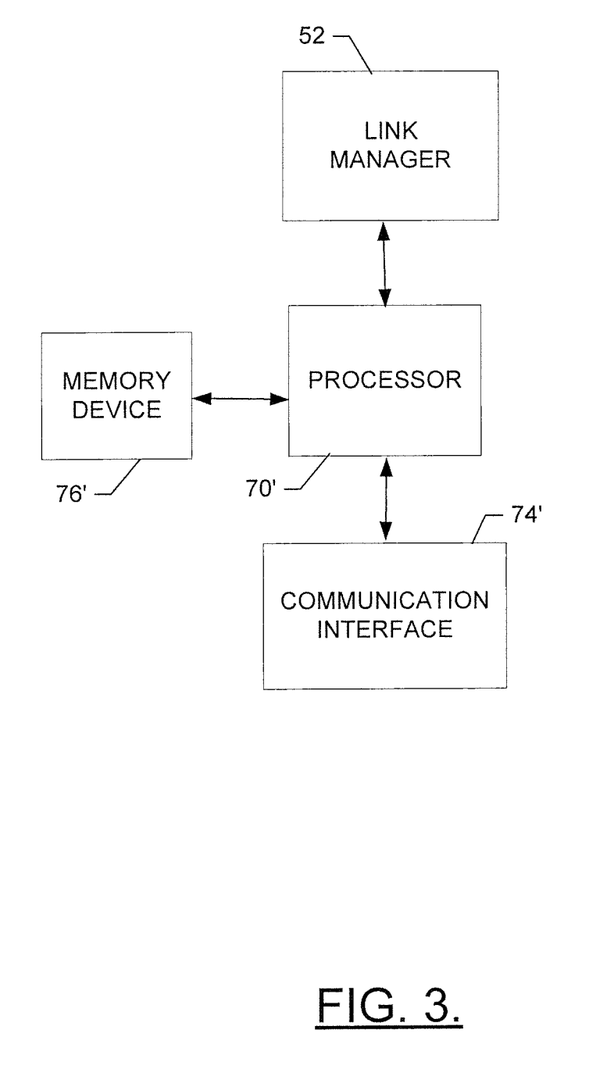
FIG. 3 illustrates a schematic block diagram of an apparatus for providing facilitation of the provision of mobile services outside of cellular coverage at an intermediate device according to an example embodiment of the present invention.

FIG. 3 illustrates an example of an apparatus for providing facilitation of the provision of mobile services outside of cellular coverage at an access point or base station according to an example embodiment of the present invention. An example embodiment of the invention will now be described with reference to FIG. 3, in which certain elements of an apparatus for providing facilitation of the provision of mobile services outside of cellular coverage at an access point or base station are displayed. The apparatus of FIG. 3 may be employed, for example, on the access point 40, the access point 42, the base station 32, and/or another device. However, it should be noted that the devices or elements described below may not be mandatory and thus some may be omitted in certain embodiments. Furthermore, additional components may be included in some embodiments.

In an example embodiment, the apparatus of FIG. 3 may include or otherwise be in communication with a processor 70', a communication interface 74' and a memory device 76'. The processor 70', the communication interface 74' and the memory device 76' may be substantially similar in function and basic structure (with perhaps semantic and/or scale differences in some cases) to the descriptions provided above for the processor 70, the communication interface 74 and the memory device 76 of the apparatus of FIG. 2. Thus, descriptions of these components will not be repeated.

In an example embodiment, the processor 70' may be embodied as, include or otherwise control the link manager 52. As such, in some embodiments, the processor 70' may be said to cause, direct or control the execution or occurrence of the various functions attributed to the link manager 52 as described herein. In an example embodiment, the link manager 52 may be configured to utilize short range and/or long range communication links (e.g., via the link provider 50) in order to communicate with communication devices and/or other access points, respectively. The link manager 52 may also monitor channel conditions (e.g., for long range communication links) and solicit data from communication devices within the coverage area of the link provider 50 when long range communication link channel conditions are good to facilitate uploading of data indicated as being available for transmission by the short range communication manager 62 so that the uploaded data can be provided via to the target device via communication to another access point (e.g., the base station 32) in which the target device may be located. Alternatively or additionally, the link manager 52 may be configured to receive data via the long range communication link from another access point to distribute to a communication device located within the coverage area of the link provider 50 associated with the link manager 52.

In some embodiments, the link manager 52 may include or otherwise communicate with a tag (e.g., an embedded etag) that may comprise a portion of the link provider 50 that is provided for short range communication (e.g., NFC, UHF, RFID, BT and/or the like) with the short range communicator 60. As such, the link provider 50 may include a RF memory tag for communication with the corresponding RF memory tag of the communication device with which the access point communicates. Thus, the link manager 52 may manage both short range and long range communication links. In some embodiments, the link manager 52 may also be configured to determine application configuration information for data that is to be sent via the etags. For example, for an SMS, the link manager 52 may receive the content of the SMS, but may also provide application information regarding the SMS application for transmission to the target device so that the target device can execute the content and the corresponding application with or without some restrictions attached to the content and the corresponding application. For example, content restrictions, device restrictions, temporal restrictions, and/or the like may be included in some cases.

Accordingly, embodiments of the present invention may provide for the utilization of long range (e.g., ionospheric links at HF frequencies or VHF frequencies) to provide relatively low bandwidth connectivity to locations that are outside normal cellular coverage areas. In some embodiments, the communication may be provided on a best effort, non-real time basis using low bit rate connections that are utilized when availability or channel conditions permit. As such, in some embodiments, guarantees regarding successful transmission may not be provided or required.

Embodiments may be used in any environment including, for example, developing countries, remote inland areas, on islands, at sea, and various other geographic locations. In some embodiments, the access points located in remote areas (e.g., outside the coverage area of the base station 32) may be paired with their respective communication devices beforehand (e.g., with shared passwords or other associations being pre-existing). Moreover, in some cases, the access points may be sold or packaged together with their respective communication devices to ensure compatibility. However, dynamic associations may also be performed in other embodiments and, for example, communication devices may even be served in a particular location after moving from a coverage area of one access point to the coverage area of a different access point.

Because example embodiments operate beyond the coverage areas of typical cells defining a cellular network, no need may be presented for changing devices at the cellular network side. Instead, burst radio link capabilities for reaching access points outside the normal cellular coverage area may enable extending the ability to provide non-real time services over relatively large areas and perhaps also with relatively low cost. Embodiments may also be useful in emergency situations in remote environments.

As indicated above, example embodiments may relate to SMS messages, email messages or other relatively small messages or data packages. The data may be buffered locally at a device, but indicated as being ready for transmission to a target device (e.g., a device in a cellular network (e.g., the second communication device 20 or a device in another remote network (e.g., the third communication device 22))). The buffered data may be in a corresponding format or protocol to permit transmission to the access point 40 located proximate to the mobile terminal 10 that has generated the buffered data. In some embodiments, the mobile terminal 10 may attempt to detect available short proximity radio coverage (e.g., by detecting the presence of the access point 40) or to detect its location. Short range communication may then be undertaken with the access point 40 if the access point 40 is within range. However, the communication may be characterized by the mobile terminal 10 pushing data to the access point 40 (or pushing portions of data to multiple access points if more than one is in range) or by the access point 40 pulling data from the mobile terminal 10. As indicated above, the access point 40 (or access points) may then send the data along toward its destination without any guarantee via a burst communication with best effort. The communication may occur over an ionospheric link or other long range communication link in an asynchronous fashion. The amount of data sent via burst communication (and in some cases perhaps also the type of data (e.g., voice data)) may be increased as the transmission conditions are sensed to improve. Moreover, in some cases, multiple hops may be initiated to forward the data to its destination.

In some embodiments, the access points may employ aspects of cognitive radio. Cognitive radio is a term that generally describes a wireless communication device that is enabled to change its transmission or reception parameters to communicate efficiently in order to avoid interference with licensed or unlicensed users. The parameter changes may be made based on active monitoring of several factors in the external and internal radio environment, such as radio frequency spectrum, user behavior and network state (e.g., whether there is congestion or whether a higher (or lower) data rate is available (or desirable) for a particular context). In an example embodiment in which, for example, the access point 40 operates as a cognitive radio, the link manager 52 may be further configured to sense or monitor various communication environmental conditions. The link manager 52 may then be configured to make communication parameter adjustments and determinations based on the conditions. As an example, when the mobile terminal 10 is powered off, but some content has been indicated as being available for transmission, the link manager 52 may detect the RF memory tag of the mobile terminal 10 when the mobile terminal 10 is within the power field of the access point 40. The link manager 52 may then direct automatic fetching of the content of the RF memory tag (or the RF memory tag can push the data to the access point 40). The access point 40 (responsive to direction from the link manager 52) may then employ cognitive radio to forward the content to the target device identified as the intended recipient for the content.

In some embodiments, the link manager 52 may be further configured to detect passive endpoints (e.g., etags) by adjusting the power level of the access point 40 (e.g., during a detection period) to determine which passive endpoints are within its coverage area. The power level of the access point 40 may then be adjusted by the link manager 52 to provide power to the etag and to affect data transfer from the etag. In some cases, power adjustments may be made, for example, to alter the power of the RF memory tags (etags) to avoid interference, reduce congestion, reduce the number of requests/responses from too large a number of tags, and/or the like. The cognitive radio powering may therefore be adjusted and managed between short range and long range radio links as needed to extract content from etags within the coverage area and send the content toward the respective target devices by long range links while avoiding interference and utilizing available spectrum efficiently.

In an example embodiment, the link manager 52 of the access point 40 may be configured to work with other link managers of other access points in order to extract data from a remote communication device that had previously provided an indication of having content for transmission. As an example, assume that the third communication device 22 (shown in the coverage area 46 of the other access point 42 in FIG. 1) was initially in the coverage area 44 of the access point 40 and provided an indication to the access point 40 that the third communication device 22 had the content for transmission during that time, but for some reason did not have that content communicated to the access point 40 while within the coverage area 44 (e.g., due to being in a queue or congestion issues). The indication may have included a content identifier (e.g., TX content ID) to permit identification of the content intended for transmission. Assume that the third communication device 22 then moved into the coverage area 46 of the other access point 42 and powered down. The link manager 52 of the access point 40 may be configured to query its coverage area (e.g., coverage area 44) to find the third communication device 22 as described above. Since the third communication device 22 will not be found in the coverage area 44, the link manager 52 may query other access points (e.g., including the other access point 42 and the base station 32 to determine whether the third communication device 22 is located in either of their coverage areas. The base station 32 may respond to indicate that the third communication device 22 is not in its coverage area. However, the other access point 42 may respond to indicate that the third communication device 22 is within its coverage area. Using cognitive radio techniques, the link manager 52 of the access point 40 may work with other link managers to communicate the content identifier to the other access point 42 to direct the other access point 42 to request or extract the content corresponding to the content identifier from the third communication device 22. The content may then be forwarded to the access point 40 (e.g., using long range communication hops as needed) to be communicated to its target destination (perhaps also with long range communication hops if needed).

Figure 4:
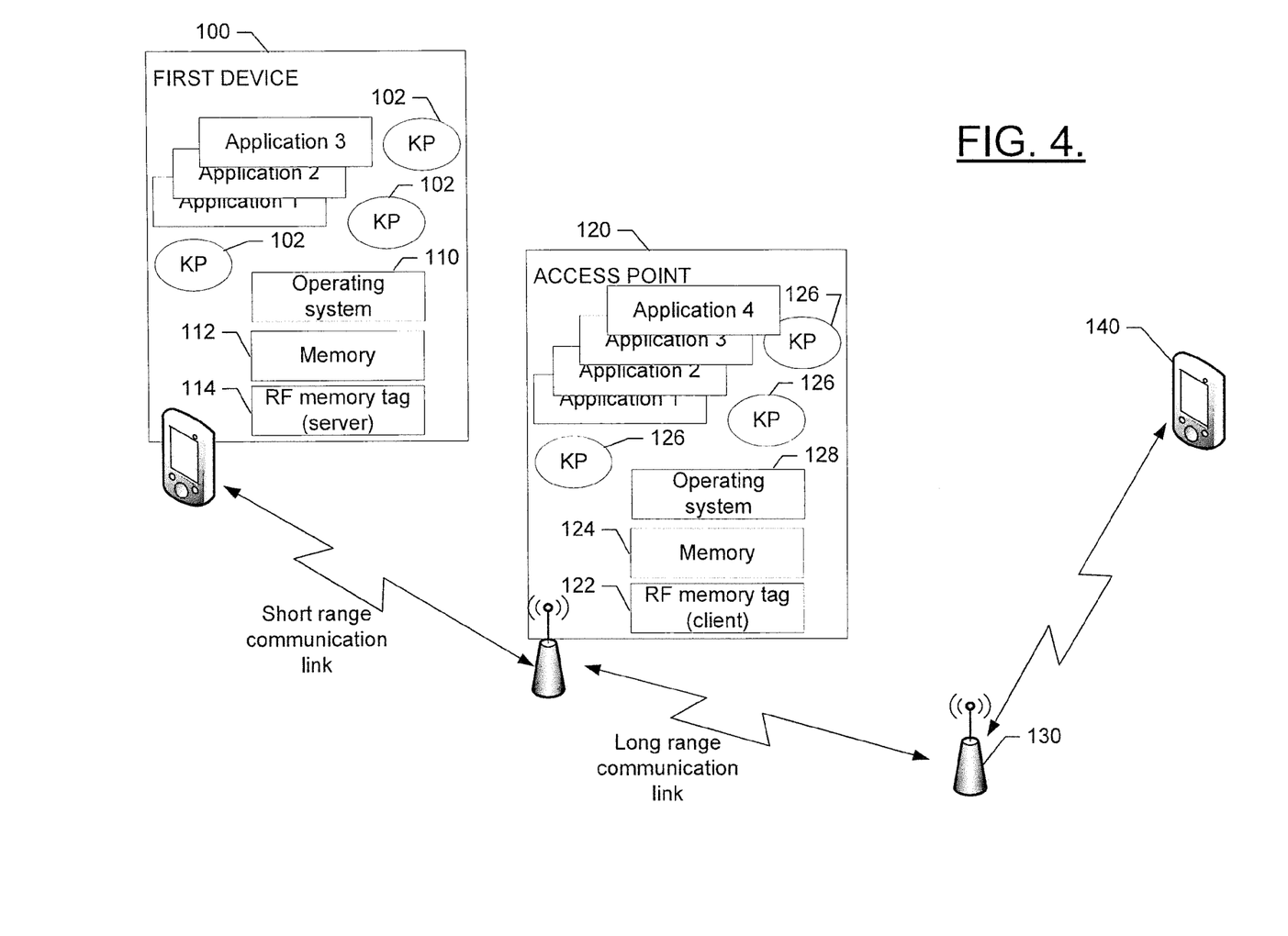
FIG. 4 illustrates an example architecture of an embodiment employing an RF memory tag in which content and/or configuration data may be communicated according to an example embodiment of the present invention.

Embodiments of the present invention may therefore employ off band resources to communicate data from one device to another, without establishing a connection between the devices. FIG. 4 illustrates an example architecture of an embodiment employing an RF memory tag such as the etag described above in which content and/or configuration data may be communicated. As shown in FIG. 4, a first device 100 (e.g., mobile terminal 10) may include one or more knowledge processors 102 and multiple applications (e.g., Application 1, Application 2, and Application 3). One of the applications may be an offline SMS application. The first device 100 may also include an operating system 110 that may include scheduling and policy management functions. The first device 100 may also include memory 112 (e.g., the memory device 76) that may include portions designated for RF memory (e.g., for cognitive radio functions), operating system memory, and etag memory such as for RF memory tag 114. The RF memory tag 114, as described above, may buffer content for transmission in accordance with example embodiments described herein. The RF memory tag 114 may include hardware for power radios and data radios such as UHF, NFC and/or I-UWB communication, respectively. In this example, the content may be SMS data corresponding to the SMS application. In some embodiments, device configuration information may be provided by one or more of the knowledge processors and a corresponding application configured for receiving content.

In an example embodiment, the content and its runtime resources may be provided to the memory 112 and therefore be made available for radio resources. The configuration block (e.g., metadata information and/or a binary block of context information for the offline SMS application) may be provided to be available with user content. The RF memory tag 114 may be notified of the stored user content and configuration (e.g., the SMS with its application information) so that the user content can be transferred along with runtime configurations and applications to an access point 120 (e.g., via the access point 120 reading the etag). The access point 120 may also include an operating system 128 that has portions for managing scheduling and policy functions. The content and configuration data may be transferred via the RF memory tag 122 of the access point 120 and stored to the memory 124 of the access point 120. In some cases, a list may be provided of the information that is available for transmission and the information may be transformed as appropriate for transmission via a long range communication link. In an example embodiment, one or more knowledge processors 126 at the access point 120 may work with respect to applications of the access point 120 to retrieve content and configuration data that may be utilized at the target device. The content and configuration data (e.g., a user context information package) received at the access point 120 may be combined with content and configuration data for the target device and the data may be sent over the access point 120 may then use a long range communication link to pass the combined user content and configuration data to another access point 130 which may provide the content and configuration data to a second device 140 (e.g., the second or third communication device 20 or 22). The second device 140 may therefore receive the content and configuration data in a format that allows the second device 140 to open and execute the content. Accordingly, for example, the sender may pay any application one time usage fees (as the recipient may not have such application otherwise available).

Some embodiments of the present invention may therefore enable working off band to utilize an embedded short range memory tag (e.g., a RF memory tag or etag) to send data (e.g., relatively small data that is not real-time data) initially to a relay station or access point that can employ long range communication links as a best effort, to a recipient relay station or access point that may then relay the data on, again using embedded memory tag processes, to its intended target. The content may be sent along with application and/or configuration information to enable the target device to execute the content and its corresponding application based on the received data even if the corresponding application is not otherwise available.

Figure 5:
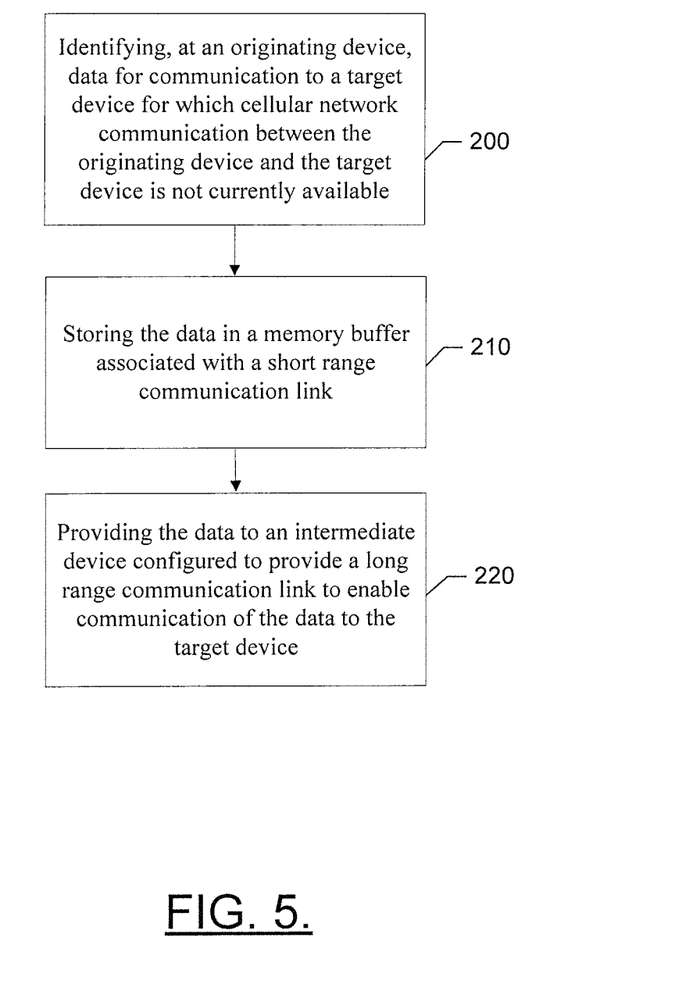
FIG. 5 is a flowchart according to an example method for providing facilitation of the provision of mobile services outside of cellular coverage at a communication device according to an example embodiment of the present invention.

FIG. 5 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine that provides for implementation of the functions specified in the flowchart block(s). These computer program instructions may also be stored in a computer-readable memory that may direct a computer or other programmable apparatus to function in a particular manner, such that the instructions stored in the computer-readable memory produce an article of manufacture which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention from the perspective of a communication device (e.g., the mobile terminal 10, the second communication device 20 or the third communication device 22), as shown in FIG. 5, may include identifying, at an originating device, data for communication to a target device for which cellular network communication between the originating device and the target device is not currently available at operation 200. The method may further include storing the data in a memory buffer associated with a short range communication link at operation 210 and providing the data to an intermediate device configured to provide a long range communication link to enable communication of the data to the target device at operation 220.

In some embodiments, certain ones of the operations above may be modified or further amplified as described below. It should be appreciated that each of the modifications or amplifications below may be included with the operations above either alone or in combination with any others among the features described herein. In an example embodiment, storing the data in a memory buffer associated with a short range communication link may include storing the data in a RF memory tag server device comprising a passive wireless memory tag. In some embodiments, providing the data to the intermediate device may include pushing data from the RF memory tag server to the intermediate device or having the data pulled from the RF memory tag server of the originating device, even perhaps while the originating device is powered off. In some embodiments, the data identified may be provided via an indication that identifies the specific content that is desired for transmission.

In an example embodiment, an apparatus for performing the method of FIG. 5 above may comprise a processor (e.g., the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 70, the short range communication manager 62, and/or a device or circuit for executing instructions or executing an algorithm for processing information as described above.

An example of an apparatus according to an example embodiment may include at least one processor and at least one memory including computer program code. The at least one memory and the computer program code may be configured to, with the at least one processor, cause the apparatus to perform the operations 200-220 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-220 (with or without the modifications and amplifications described above in any combination).

Figure 6:
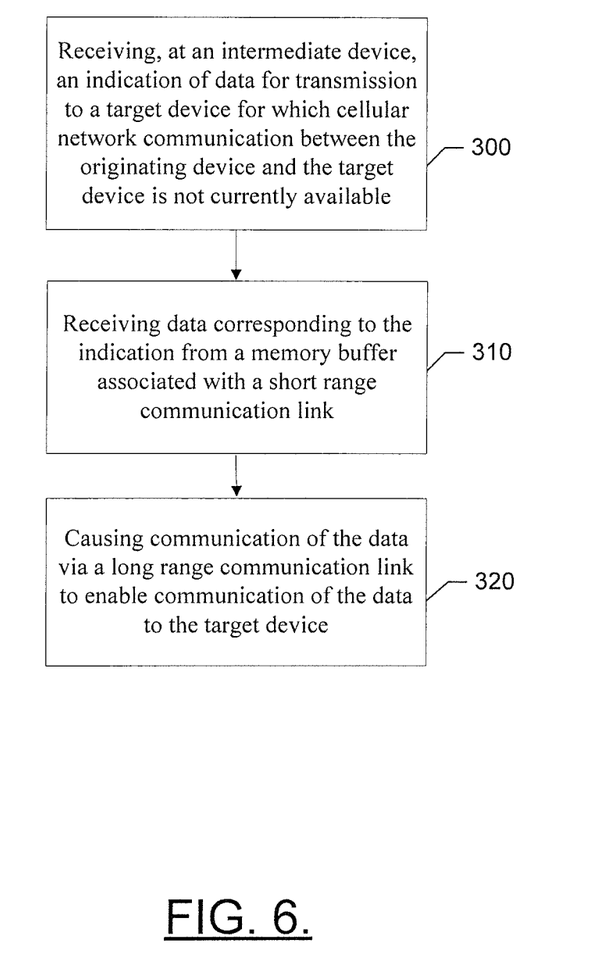
FIG. 6 is a flowchart according to an example method for providing facilitation of the provision of mobile services outside of cellular coverage at an intermediate device according to an example embodiment of the present invention.

In some embodiments, a method according to one embodiment of the invention from the perspective of an intermediate device (e.g., access points 40, 42 and base station 32), as shown in FIG. 6, may include receiving, at an intermediate device, an indication of data for transmission to a target device for which cellular network communication between the originating device and the target device is not currently available at operation 300. The method may further include receiving data corresponding to the indication from a memory buffer associated with a short range communication link at operation 310 and causing communication of the data via a long range communication link to enable communication of the data to the target device at operation 320.

In some embodiments, certain ones of the operations above may be modified or further amplified as described below. It should be appreciated that each of the modifications or amplifications below may be included with the operations above either alone or in combination with any others among the features described herein. In an example embodiment, receiving the data may include storing the data in a memory buffer associated with a short range communication link such as a RF memory tag client device comprising a wireless memory tag. In some embodiments, receiving the data may include receiving pushed data from a RF memory tag server at the originating device or pulling the data from the RF memory tag server of the originating device, even perhaps while the originating device is powered off. In some embodiments, the indication may identify the specific content that is desired for transmission using a client identifier. In some cases, the apparatus may employ cognitive radio techniques. The long range communication link may therefore be utilized with burst transmissions based on communication environment quality.

In an example embodiment, an apparatus for performing the method of FIG. 6 above may comprise a processor (e.g., the processor 70) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 70, the link manager 52, and/or a device or circuit for executing instructions or executing an algorithm for processing information as described above.

An example of an apparatus according to an example embodiment may include at least one processor and at least one memory including computer program code. The at least one memory and the computer program code may be configured to, with the at least one processor, cause the apparatus to perform the operations 300-320 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 300-320 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at an intermediate device, an indication of data for transmission to a target device for which cellular network communication between an originating device and the target device is not currently available;
   receiving data corresponding to the indication from a memory buffer associated with a short range communication link, wherein the indication identifies content that is desired for transmission using a client identifier, wherein receiving the data comprises causing the data to be pulled from a radio frequency (RF) memory tag server of the originating device while the originating device is powered off; and
   causing communication of the data via a long range communication link to enable communication of the data to the target device.

2. The method of claim 1, wherein receiving the data comprises causing the data to be stored in a memory buffer associated with a short range communication link of a radio frequency (RF) memory tag client device comprising a wireless memory tag.

3. The method of claim 1, wherein receiving the data comprises receiving pushed data from a radio frequency (RF) memory tag server at the originating device.

4. The method of claim 1, wherein receiving the data comprises causing the data to be pulled from a radio frequency (RF) memory tag server of the originating device.

5. The method of claim 1, wherein the intermediate device employs cognitive radio techniques, and wherein the long range communication link is utilized with burst transmissions based on communication environment quality.

6. The method of claim 1, wherein the long range communication link is utilized with one or more burst transmissions based on at least one communication environment quality.

7. A computer program product comprising a computer-readable storage medium bearing computer program code embodied therein for use with a computer, the computer program code comprising program code instructions for:
   receiving, at an intermediate device, an indication of data for transmission to a target device for which cellular network communication between an originating device and the target device is not currently available;
   receiving data corresponding to the indication from a memory buffer associated with a short range communication link, wherein the indication identifies content that is desired for transmission using a client identifier, wherein program code instructions for receiving the data include instructions for pulling the data from a radio frequency (RF) memory tag server of the originating device while the originating device is powered off; and causing communication of the data via a long range communication link to enable communication of the data to the target device.

8. The computer program product of claim 7, wherein program code instructions for receiving the data include instructions for storing the data in a memory buffer associated with a short range communication link of a radio frequency (RF) memory tag client device comprising a wireless memory tag.

9. The computer program product of claim 7, wherein program code instructions for receiving the data include instructions for receiving pushed data from a radio frequency (RF) memory tag server at the originating device.

10. The computer program product of claim 7, wherein program code instructions for receiving the data include instructions for pulling the data from a radio frequency (RF) memory tag server of the originating device.

11. The computer program product of claim 7, wherein the intermediate device employs cognitive radio techniques, and wherein the long range communication link is utilized with burst transmissions based on communication environment quality.

12. The computer program product of claim 7, wherein the long range communication link is utilized with one or more burst transmissions based on at least one communication environment quality.

13. An apparatus comprising:

means for receiving, at an intermediate device, an indication of data for transmission to a target device for which cellular network communication between an originating device and the target device is not currently available;

means for receiving data corresponding to the indication from a memory buffer associated with a short range communication link, wherein the indication identifies content that is desired for transmission using a client identifier, wherein means for receiving the data comprises means for pulling the data from a radio frequency (RF) memory tag server of the originating device while the originating device is powered off; and means for causing communication of the data via a long range communication link to enable communication of the data to the target device.

14. The apparatus of claim 13, wherein means for receiving the data comprises means for causing the data to be stored in a memory buffer associated with a short range communication link such as a radio frequency (RF) memory tag client device comprising a wireless memory tag.

15. The apparatus of claim 13, wherein means for receiving the data comprises means for receiving pushed data from a radio frequency (RF) memory tag server at the originating device.

16. The apparatus of claim 13, wherein means for receiving the data comprises means for pulling the data from a radio frequency (RF) memory tag server of the originating device.

17. The apparatus of claim 13, wherein the long range communication link is utilized with one or more burst transmissions based on at least one communication environment quality.

* * * * *